United States Patent

Tasaka

[11] Patent Number: 6,116,886
[45] Date of Patent: Sep. 12, 2000

[54] PART MOLDING METHOD FOR MANUFACTURE OF LENS-FITTED PHOTO FILM UNIT

[75] Inventor: Hisashi Tasaka, Minami-Ashigara, Japan

[73] Assignee: Fuji Photo Film Co., Ltd., Kanagawa, Japan

[21] Appl. No.: 09/041,032

[22] Filed: Mar. 12, 1998

[30] Foreign Application Priority Data

Mar. 17, 1997 [JP] Japan ..................................... 9-063385

[51] Int. Cl.⁷ .................................................. B29C 33/14
[52] U.S. Cl. .......................... 425/183; 249/102; 425/190
[58] Field of Search ................................ 264/328.1, 219; 425/183, 190, 192 R, 195; 249/102–104

[56] References Cited

U.S. PATENT DOCUMENTS

| | | |
|---|---|---|
| 3,251,460 | 5/1966 | Edmonds . |
| 4,551,084 | 11/1985 | Lake . |
| 4,979,720 | 12/1990 | Robinson ............................. 425/192 R |
| 5,387,096 | 2/1995 | Wieser ..................................... 425/190 |
| 5,536,463 | 7/1996 | Baccman ................................. 425/190 |
| 5,662,948 | 9/1997 | Sjoberg ................................... 425/195 |

FOREIGN PATENT DOCUMENTS 883932 10/1971 Canada ................................. 425/192
59-167237 9/1984 Japan .................................... 425/190

OTHER PUBLICATIONS

Pye, Injection Mould Design, pp. 42–47, 1968.

*Primary Examiner*—Jill L. Heitbrink
*Attorney, Agent, or Firm*—Young & Thompson

[57] ABSTRACT

Flash built-in and flashless types of lens-fitted photo film units respectively include first and second front covers. The first front cover includes a first front wall and a first cover wall formed in an erect orientation relative to the first front wall. The second front cover includes a second front wall shaped partially equally to the first front wall. A second cover wall is formed in an erect orientation relative to the second front wall and shaped at least partially equally to the first cover wall. In molding operation for the front covers, the first or second cover wall is formed between a main cavity mold and a main core mold, which are confronted with each other. The main core mold is movable relative to the main cavity mold in a direction according to the erect orientation of the first and second cover walls. The first or second front wall is formed between the main core mold and a selected one of first and second auxiliary molds. The first and second auxiliary molds are selectively fitted in a portion of the main cavity mold, confronted with the main core mold, and shaped differently from each other at least partially. The main cavity mold and the main core mold are allowed to be used commonly between the first and second front covers.

2 Claims, 4 Drawing Sheets

F I G. 1
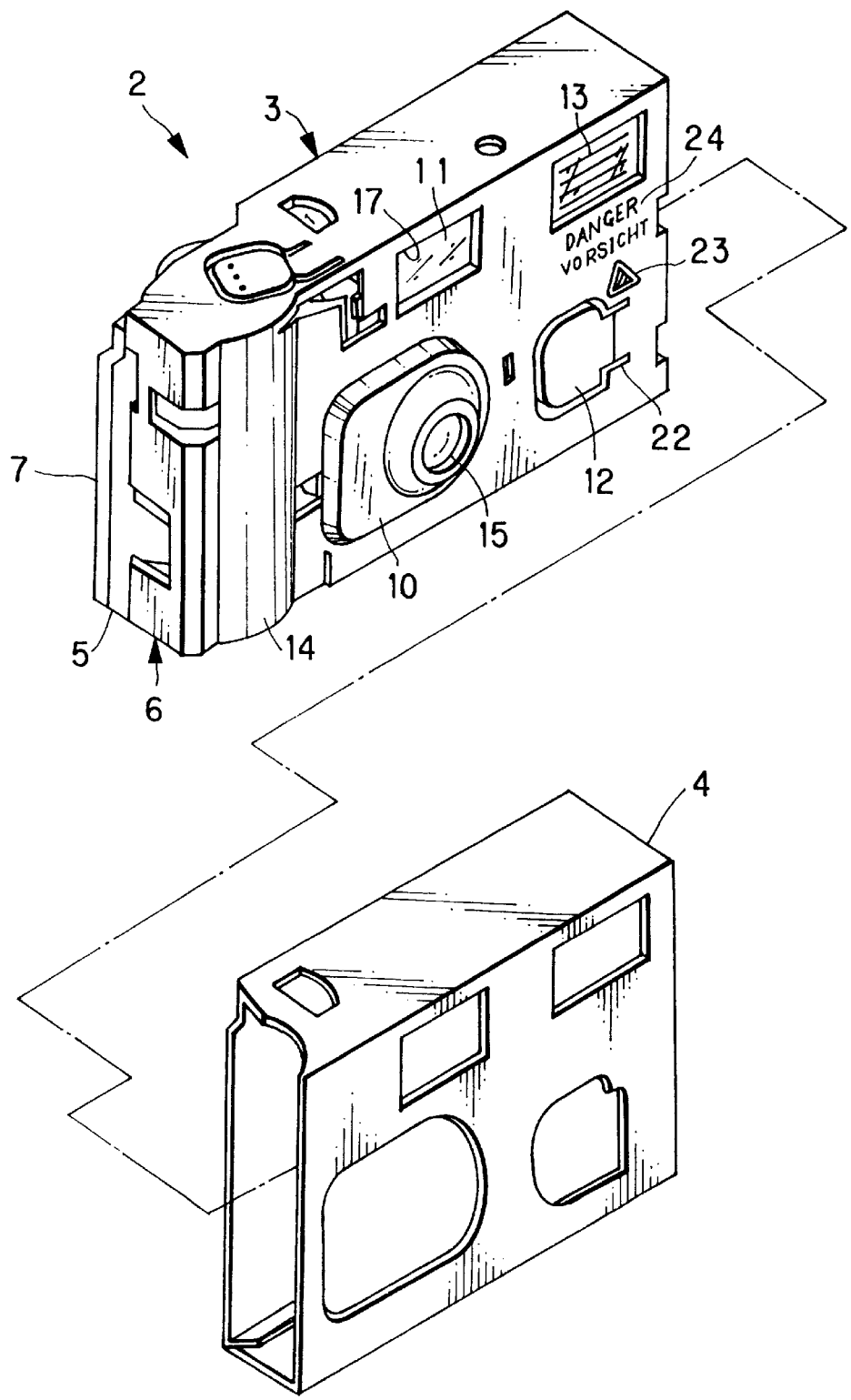

PART MOLDING METHOD FOR MANUFACTURE OF LENS-FITTED PHOTO FILM UNIT

BACKGROUND OF THE INVENTION

1. Field of the Invention

The present invention relates to a part molding method for manufacture of a lens-fitted photo film unit. More particularly, the present invention relates to a part molding method for manufacture of a lens-fitted photo film unit, in which convenience in manufacturing plural types of lens-fitted photo film units is increased.

2. Description Related to the Prior Art

A lens-fitted photo film unit includes a photo film housing or body, which incorporates a simple exposure mechanism, is pre-loaded with unexposed photo film, and is covered inside a cardboard wrapper or packaging which has a printed pattern. There are two types of the lens-fitted photo film unit, including a flash built-in type and a flashless type.

In the flashless type, an exposure aperture is formed to define a range on a photo film to be exposed, and located between a photo film supply chamber and a cassette containing chamber. The photo film housing of the flashless type is constituted by an exposure unit or photo film containing unit, a front cover and the rear cover. The exposure unit includes the exposure aperture, the photo film supply chamber and the cassette containing chamber. The outer wall of the photo film supply chamber has a curve protruding toward the front in a partially cylindrical shape. The front and the rear of the exposure unit are covered by the front cover and the rear cover. Each of the parts is formed by injection molding.

In the flash built-in type, a printed circuit board including parts for the flash circuit is mounted on an outer wall of the photo film supply chamber in a position near to the exposure aperture. An interval between the exposure aperture and the photo film supply chamber is determined great in the exposure unit. The front cover and the rear cover have a relatively greater length than a length of those for the flashless type. The front cover further includes a flash emitter window and a warning message indicating electrical danger of the flash device.

To reduce the cost in manufacturing the lens-fitted photo film unit of the flash built-in type and the flashless type, there is a suggestion of using the exposure unit or the rear cover for the flash built-in type also for the flashless type. Two types of the front cover should be produced, including a type having the flash emitter window and the warning message and another lacking them. For this purpose, two kinds of mold sets should be used, including one kind having subsidiary core/cavity combinations for molding the flash emitter window and the warning message, and another lacking such subsidiary core/cavity combinations.

To mold the two kinds of the front cover requires two kinds of the mold sets, and raises the manufacturing cost. Each mold in the mold sets is one piece including the subsidiary cores or cavities. If a small modification in an outer shape of a part to be molded is intended, each mold must be prepared again. There is an additional process of replacing the mold with a newly prepared one. A problem lies in delay or slow speed in supplying the front cover.

SUMMARY OF THE INVENTION

In view of the foregoing problems, an object of the present invention is to provide a part molding method for manufacture of a lens-fitted photo film unit, which is suitable for manufacturing plural types of lens-fitted photo film units.

In order to achieve the above and other objects and advantages of this invention, a part molding method is used for manufacture of a lens-fitted photo film unit of at least first and second types, the first and second types respectively including first and second parts, the first part including a first wall and a first rise face formed in an erect orientation relative to the first wall, the second part including a second wall shaped partially equally to the first wall, and a second rise face formed in an erect orientation relative to the second wall and shaped at least partially equally to the first rise face. In the part molding method, the first or second rise face is formed between first and second main molds, wherein the first and second main molds are confronted with each other, and movable relative to each other in one release direction predetermined in accordance with the erect orientation of the first and second rise faces. The first or second wall is formed between the second main mold and a selected one of first and second auxiliary molds, wherein the first and second auxiliary molds are selectively fitted in a portion of the first main mold, confronted with the second main mold, and shaped differently from each other at least partially, so as to allow the first and second main molds to be used commonly between the first and second parts.

In a preferred embodiment, the first main mold is a main cavity mold. The second main mold is a main core mold inserted in the main cavity mold. A first receiving recess is formed in the main cavity mold for receiving the first or second auxiliary mold.

The first auxiliary mold includes at least one auxiliary core, and the first part includes at least one opening or recess formed in the first wall by the auxiliary core.

The lens-fitted photo film unit includes an exposure unit, pre-loaded with photo film, for taking an exposure thereon. A rear cover covers a rear of the exposure unit. A front cover constitutes the first or second part, wherein the first or second wall covers a front of the exposure unit, and the front cover includes at least one cover wall, disposed to project from at least one of a top side, a bottom side and two lateral sides of the first or second wall, having the first or second rise face, for partially covering the exposure unit.

Furthermore a selected one of third and fourth auxiliary molds is fitted in a portion of the main core mold, confronted with the first or second auxiliary mold, and the first wall is formed between the first and third auxiliary molds, and the second wall is formed between the second and fourth auxiliary molds.

In a preferred embodiment, a second receiving recess is formed in the main core mold for receiving the third or fourth auxiliary mold. The at least one opening is formed to come through the first wall. The third auxiliary mold includes at least one auxiliary cavity formed therein, for receiving the at least one auxiliary core, and to form the at least one opening in the first wall.

The first type includes a flash device, disposed on the exposure unit, for emitting flash light.

For example, the at least one opening or recess includes a flash emitter window for passing the flash light from the flash device.

Or the at least one opening or recess includes a flash indicia for indicating existence of the flash device in a literal or symbolic manner.

The first type further includes a through hole formed in the front cover. A pushbutton portion is disposed to project from an edge of the through hole, resiliently depressed toward the exposure unit, for switching on the flash device, wherein at least one opening or recess is defined about the pushbutton portion inside the through hole.

BRIEF DESCRIPTION OF THE DRAWINGS

The above objects and advantages of the present invention will become more apparent from the following detailed description when read in connection with the accompanying drawings, in which:

FIG. 1 is an exploded perspective illustrating a lens-fitted photo film unit;

DETAILED DESCRIPTION OF THE PREFERRED EMBODIMENTS OF THE PRESENT INVENTION

Figure 1A:
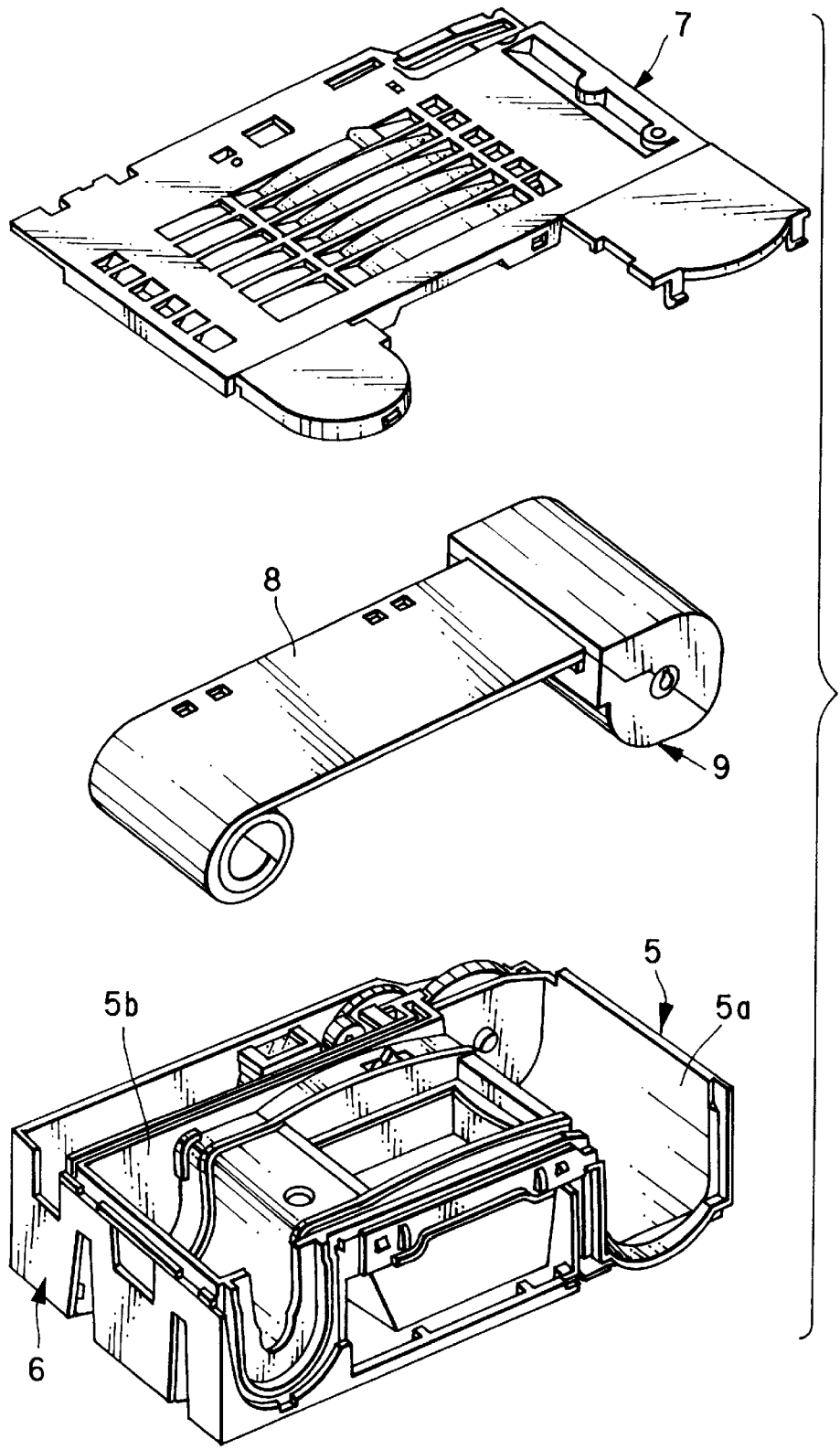
FIG. 1A is an exploded perspective illustrating the lens-fitted photo film unit as viewed from the rear.
Figure 2:
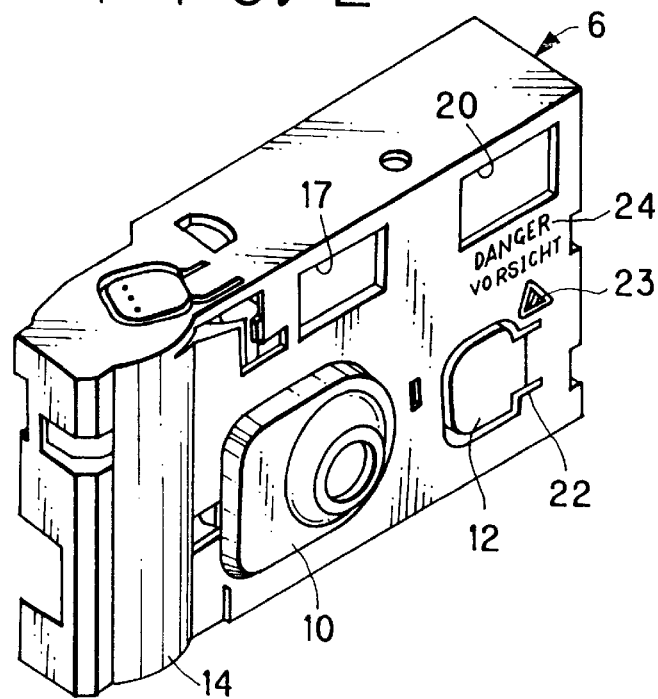
FIG. 2 is a perspective illustrating a front cover of the lens-fitted photo film unit.

In FIGS. 1 and 1A, a lens-fitted photo film unit 2 of a flash built-in type is depicted. In FIG. 2, a front cover 6 as a molded part of the lens-fitted photo film unit 2 is illustrated. The lens-fitted photo film unit 2 includes a photo film housing or body 3 which has a substantially rectangular shape, and covered inside a wrapper belt 4 of cardboard. The housing 3 incorporates an exposure mechanism of a simple structure and an electronic flash device, and is pre-loaded with unexposed photo film 8 and a cassette 9. The housing 3 is constituted by an exposure unit or photo film containing unit 5, a rear cover 7 and the front cover 6. The rear cover 7 covers the rear of the exposure unit 5. The front cover 6 covers the front of the exposure unit 5. The front and rear covers 6 and 7 are formed from plastic material by injection molding. There are plural openings formed in the wrapper belt 4 for disposition of a protrusion 10, a finder objective lens 11 of a viewfinder, a pushbutton portion 12 for starting charging the flash device, a flash emitter 13 of an electronic flash device and the like.

The front cover 6 includes a front wall and peripheral cover walls, which are disposed on top, bottom, right and left sides of the front wall. The cover walls have a "rise face", which is oriented erectly from the front wall.

The front cover 6 has the protrusion 10 formed integrally with its front. The protrusion 10 contains the simple exposure mechanism including a taking lens 15. There is a finder window 17 formed in the front cover 6 near to the protrusion 10. The finder lens 11 appears through the finder window 17 externally.

A cassette containing chamber 5a is formed inside the exposure unit 5 for receiving the photo film after exposure. The outer wall of the chamber 5a has a curve protruding toward the front in a partially cylindrical shape. There is a grip 14 on the right side of a front of the front cover 6. The grip 14 is also curved to be fitted on the outer wall of the cassette containing chamber 5a. A reference numeral 5b designates a photo film supply chamber.

On the left side of the front cover 6, a flash emitter window 20 and the pushbutton portion 12 are disposed in upper and lower positions. The flash emitter window 20 is formed in the front cover 6 so that the flash emitter 13 appears through it externally. The pushbutton portion 12 is defined by a through hole 22 or a channel-shaped slit formed in the front cover 6, and is depressible toward the exposure unit 5.

Between the flash emitter window 20 and the pushbutton portion 12, there are arranged a flash mark 23 and warning message 24 of DANGER and VORSICHT, both of which consist of combined recesses, and are "flash indicia" for the purpose of warning users of danger of an electric shock in manually handling the built-in flash. The flash mark 23 and the warning message 24 are covered by the wrapper belt 4, and become observable when the wrapper belt 4 is torn.

Figure 3:
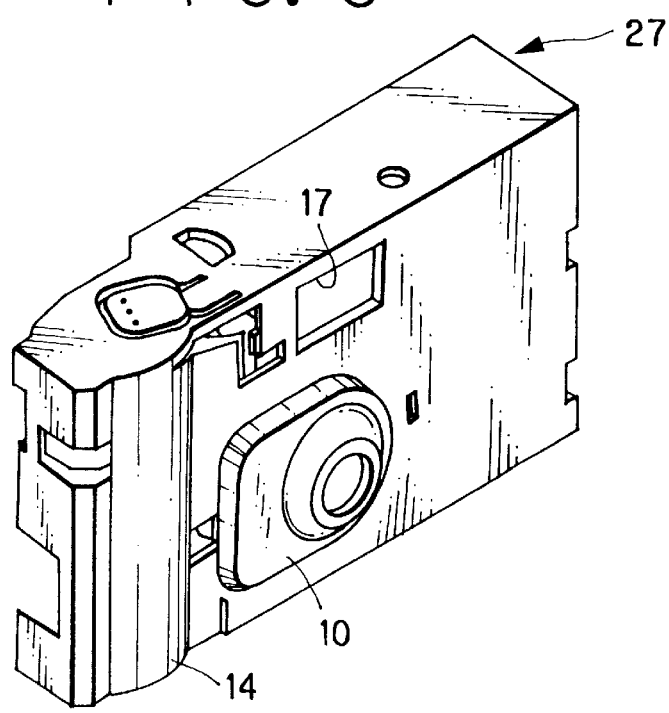
FIG. 3 is a perspective illustrating another front cover used for a flashless type.

In FIG. 3, a front cover 27 as a molded part of a lens-fitted photo film unit of a flashless type is illustrated. The front of the front cover 27 has the protrusion 10, the finder window 17 and the grip 14 in a manner common with the front cover 6. The front cover 27 has a top wall, a bottom wall and both side walls all the same as those of the front cover 6. Elements in FIG. 3 similar to those in FIG. 2 are designated with identical reference numerals. As the front cover 27 is used for the flashless type, it does not have the flash emitter window 20, the through hole 22, the flash mark 23 and the warning message 24. Portions corresponding to those are flatly formed.

Figure 4:
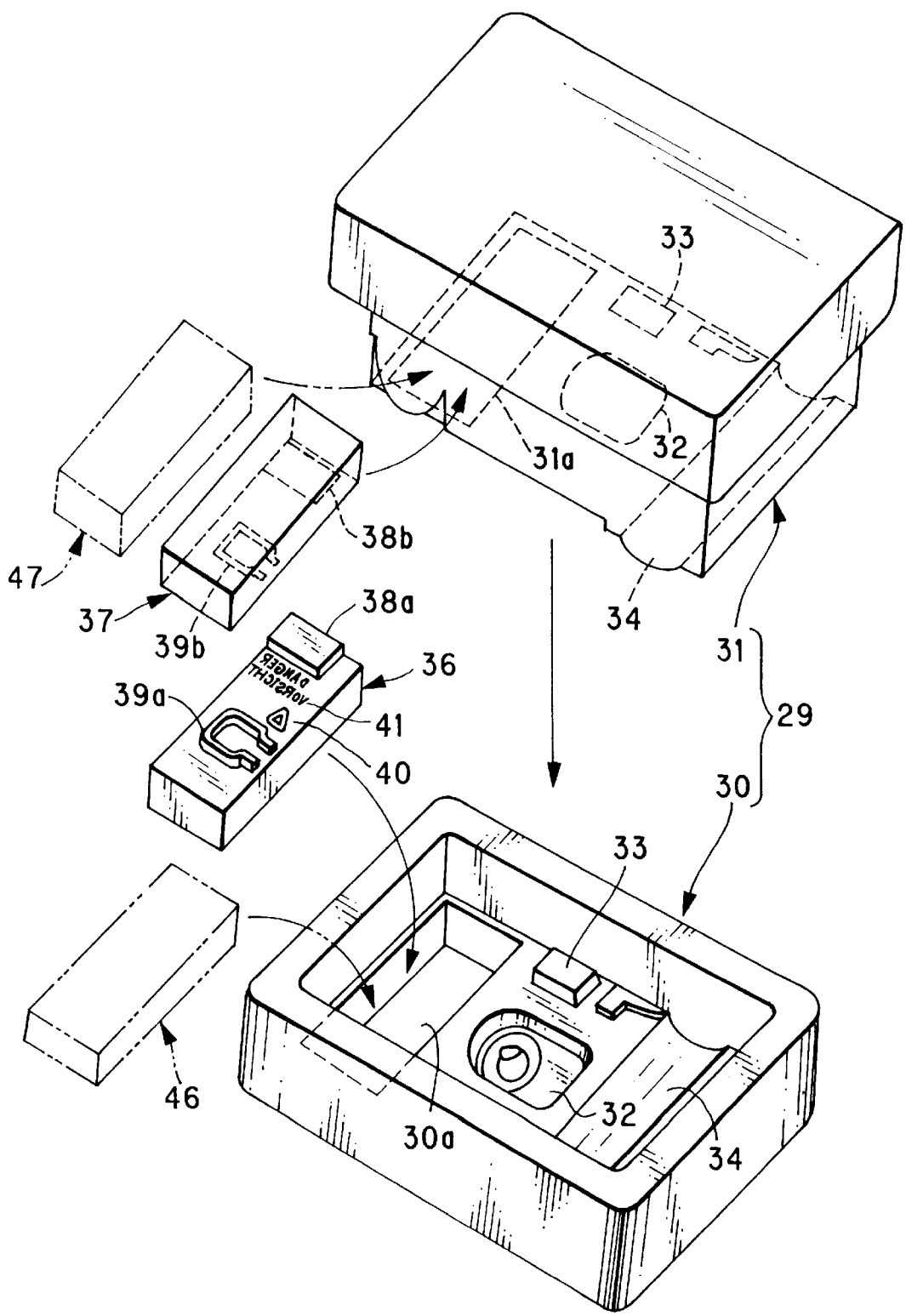
FIG. 4 is a perspective illustrating a mold set for molding the front covers.

In FIG. 4, a mold set 29 for molding the front cover is depicted. The mold set 29 is constituted by a combination of a main cavity mold 30, a main core mold 31, and plural kinds of auxiliary molds. One of the main cavity mold 30 and the main core mold 31 is a stationary mold, another of them being a movable mold. The auxiliary molds are insertable into the cavity of the main cavity mold 30 in an exchangeable manner. The auxiliary molds are selectively used in the main cavity mold 30 and the main core mold 31 in association with a selected one of the types of lens-fitted photo film to be manufactured.

The cavity in the main cavity mold 30 and the core of the main core mold 31 have portions for forming a shape common between the front covers 6 and 27. Confronted faces of the main cavity mold 30 and the main core mold 31 have subsidiary core/cavity combinations 32, 33 and 34, which are oriented crosswise to the release direction of the mold set. The subsidiary core/cavity combination 32 molds the protrusion 10. The subsidiary core/cavity combination 33 molds the finder window 17. The subsidiary core/cavity combination 34 molds the grip 14. Any of the subsidiary core/cavity combinations 32–34 is formed with the main cavity mold 30 and the main core mold 31 in the inseparable manner. Of course surfaces of the main cavity mold 30 and the main core mold 31 oriented in the release direction have shapes all common between the front covers 6 and 27.

There are receiving recesses 30a and 31a disposed on the side opposite to the subsidiary core/cavity combination 34 for forming the grip. The receiving recesses 30a and 31a are oriented crosswise to a release direction of the mold set 29. In the injection molding of the front cover 6 for the flash built-in type, auxiliary molds 36 and 37 are fitted respectively in the receiving recesses 30a and 31a. Auxiliary cores 38a and 39a are formed on a contact face of the auxiliary mold 36. Auxiliary cavities 38b and 39b are formed in a confronted face of the auxiliary mold 37. The auxiliary core 38a and the auxiliary cavity 38b form the flash emitter window 20. The auxiliary core 39a and the auxiliary cavity 39b form the through hole 22. Auxiliary cores 40 and 41 are formed on the auxiliary mold 36 of the front side, for forming the flash mark 23 and the warning message 24.

The operation of manufacturing the front cover by use of above-described construction is referred to now. At first the auxiliary molds 36 and 37 are inserted in the main cavity mold 30 and the main core mold 31. The main core mold 31 is shifted in the arrow direction as depicted, and fitted on the main cavity mold 30. Melted plastic or resin is poured into the mold set 29 between the main cavity mold 30 and the main core mold 31, to form the front cover 6. The subsidiary core/cavity combinations 32–34 disposed on the main cavity mold 30 and the main core mold 31 form the protrusion 10, the finder window 17 and the grip 14 with the front cover 6. The auxiliary cores 38a and 39a, the auxiliary cavities 38b and 39b and the auxiliary cores 40 and 41, which are disposed on the auxiliary molds 36 and 37, form the shapes of the flash emitter window 20 and the through hole 22 through the front cover 6, and form the flash mark 23 and the warning message 24 on the front of the front cover 6.

To produce the front cover 27, flat auxiliary molds 46 and 47 having flat confronted faces are used instead of the auxiliary molds 36 and 37 and inserted respectively in the main cavity mold 30 and the main core mold 31 for the injection molding. None of the flash emitter window 20, the through hole 22, the flash mark 23 and the warning message 24 is formed, because the confronted faces are flat. The front cover 27 is obtained with two flat surfaces being front and rear.

In the above embodiment, neither of the main cavity mold and the main core mold requires any portions for forming the flash emitter window 20, the through hole 22, the flash mark 23 and the warning message 24. Consequently the main cavity mold and the main core mold can be used commonly for the plural types. It is possible considerably to reduce the manufacturing cost. Note that it is further possible in the present invention to produce the rear cover, a plastic part of the photo film housing or the exposure unit, or any moldable part of a lens-fitted photo film unit by use of a common combination of a main cavity mold and a main core mold.

In the above embodiment, the main cavity mold 30 is stationary while the main core mold 31 is movable. Alternatively a main core mold included in the mold set may be stationary, and a main cavity mold may be movable.

In the above embodiment, the flat auxiliary mold 46 is combined with the flat auxiliary mold 47. Alternatively the use of the flat auxiliary mold 47 may be omitted. To form the front cover 27, the flat auxiliary mold 46 may be confronted with the auxiliary mold 37. Also the main core mold 34 may be one piece including the auxiliary mold 37 with the auxiliary cavities 38b and 39b. As a result, the rear of the front cover 27 will have projections, which will be redundant but helpful in reducing the cost for preparing the exchangeable auxiliary molds 37 and 47 with the main core mold 34.

In the above embodiment, the auxiliary mold 36 is combined and confronted with the auxiliary mold 37. However the auxiliary mold 37 may be omitted. The auxiliary mold 36 may be confronted directly with the main core mold 31 in the operation of injection molding.

In the above embodiment, the front cover 6, 27 is constituted by the front wall and the peripheral cover walls, which are disposed on the top, bottom, right and left sides. However the cover walls may be omitted. The front cover may consist only of the front wall, or a flat plate.

In the above embodiment, the auxiliary cores 40 and 41 are used. Alternatively auxiliary cavities may be formed in the auxiliary mold 36 in mirrored shapes of the letters and signs, so that the front cover 6 may be provided with the flash mark 23 and the warning message 24 as combined projections.

In the above embodiment, the main cavity mold 30 is combined with the main core mold 31. Alternatively a set of molds may be basically constituted by a pair of main cavity molds, which may have a respective cavity associated with a half of a molded part. Between the main cavity molds, a front cover or other molded part may be formed.

Although the main core mold 31 in the above embodiment does not have a main cavity, it is possible to form a groove-shaped cavity around the rectangular main core with a small width.

In the above embodiment, the release direction of the mold set is predetermined in accordance with the erect orientation of the "rise faces" or the cover walls around the front wall. Although the "rise faces" are vertically erect toward the rear of the front wall, they may rise with an inclination or curvature. Although the cover walls as rise faces in the above embodiment are disposed on the periphery of the front wall, a "rise face" may be defined around a protruding portion on the middle of the molded part.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A set of molds for injection molding of a part of a lens-fitted photo film unit, comprising:

first mold half consisting of a main cavity mold comprising a grip-forming subcavity, a lens protrusion-forming subcavity, and a viewfinder-forming subcore;

a second mold half consisting of a main core mold comprising a grip-forming subcore, a lens protrusion-forming subcore, and a viewfinder-forming subcavity, adapted to align with, respectively, the grip-forming subcavity, the lens protrusion-forming subcavity, and the viewfinder-forming subcore of the main cavity mold;

a recess disposed within one of the main cavity mold and the main core mold;

a plurality of removable inserts, each said insert being structured to allow the insert to be positioned within the recess, the plurality of removable inserts comprising at least a blank insert and a flash-forming insert, the flash-forming insert comprising at least a flash window-forming subcore and a flash button-forming subcore;

wherein one of the mold halves with one of the plurality of removable inserts positioned therein is structured and arranged to be used with another of the mold halves to form a lens-fitted photo film unit component;

wherein each of the removable inserts comprises a first side adapted to face the mold half into which the removable insert is not inserted, the first side of the blank insert being entirely planar, the first face of the flash-forming insert having the flash window-forming subcore and a flash button-forming subcore arranged thereon;

wherein the main core mold, the main cavity mold, and the flash-forming insert are structured and arranged so that the flash window-forming subcore and a flash button-forming subcore make contact with the mold half into which the respective subcore is not inserted so that openings may be present in said film unit component produced by said set of molds; and wherein a portion of the mold half into which the removable insert is not inserted which confronts the first face of the removable insert includes at least a flash window-forming subcavity and a flash button-forming subcavity, so that the lens-fitted photo film unit component produced by the set of molds when the blank insert is positioned within the main cavity mold contains regions of increased thickness corresponding to the flash window-forming subcavity and a flash button-forming subcavity.

2. The set of molds of claim 1, wherein the recess is disposed within the main cavity mold.

* * * * *